(12) United States Patent  
Daugela et al.

(10) Patent No.: US 9,001,452 B2  
(45) Date of Patent: Apr. 7, 2015

(54) HEAD TO MEDIA PROXIMITY DETECTION

(71) Applicant: Seagate Technology LLC, Cupertino, CA (US)

(72) Inventors: Antanas Daugela, Bloomington, MN (US); Jon D. Trantham, Chanhassen, MN (US); Srinivas Tadepalli, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/063,942

(22) Filed: Oct. 25, 2013

(65) Prior Publication Data

US 2014/0268407 A1    Sep. 18, 2014

Related U.S. Application Data

(60) Provisional application No. 61/801,189, filed on Mar. 15, 2013.

(51) Int. Cl.  
*G11B 21/02* (2006.01)  
*G11B 5/02* (2006.01)  
*G11B 5/60* (2006.01)

(52) U.S. Cl.  
CPC ............ *G11B 5/6029* (2013.01); *G11B 5/607* (2013.01); *G11B 5/6076* (2013.01)

(58) Field of Classification Search  
None  
See application file for complete search history.

(56) References Cited

U.S. PATENT DOCUMENTS

| | | | |
|---|---|---|---|
| 6,417,982 B1 * | 7/2002 | Ottesen et al. | 360/77.02 |
| 6,483,297 B2 * | 11/2002 | Sobey | 324/210 |
| 6,935,925 B1 | 8/2005 | Agrawal et al. | |
| 7,016,139 B2 | 3/2006 | Baumgart et al. | |
| 7,489,466 B2 * | 2/2009 | Knigge et al. | 360/75 |
| 7,518,813 B1 * | 4/2009 | Egan et al. | 360/25 |
| 7,742,255 B2 | 6/2010 | Daugela et al. | |
| 7,885,025 B2 | 2/2011 | Eppler et al. | |
| 7,916,420 B1 * | 3/2011 | McFadyen et al. | 360/75 |
| 8,059,357 B1 | 11/2011 | Knigge et al. | |
| 8,085,490 B2 * | 12/2011 | Franca-Neto et al. | 360/75 |
| 8,422,160 B1 * | 4/2013 | Madden et al. | 360/75 |
| 8,599,506 B2 * | 12/2013 | Contreras et al. | 360/31 |
| 2005/0057834 A1 | 3/2005 | Hirano et al. | |
| 2008/0158704 A1 * | 7/2008 | Knigge et al. | 360/31 |
| 2008/0316636 A1 * | 12/2008 | Kuwahara | 360/75 |
| 2009/0296262 A1 * | 12/2009 | Ikeda | 360/75 |
| 2010/0157485 A1 * | 6/2010 | Narayanan et al. | 360/328 |
| 2011/0043938 A1 * | 2/2011 | Mathew et al. | 360/31 |
| 2012/0050907 A1 * | 3/2012 | Haapala | 360/59 |
| 2012/0287529 A1 * | 11/2012 | Lueng et al. | 360/75 |

* cited by examiner

Primary Examiner — Dismery Mercedes  
(74) Attorney, Agent, or Firm — HolzerIPLaw, PC

(57) ABSTRACT

In one implementation, a method and apparatus is provided for determining an active fly height setting for a transducer head from samples collected from a proximity sensor during less than a single revolution of a disc. Implementations of the method and system use adaptive discrete wavelet transform parameters generated from the collected samples to determine an active fly height setting for a transducer head.

18 Claims, 7 Drawing Sheets

HEAD TO MEDIA PROXIMITY DETECTION

CROSS-REFERENCE TO RELATED APPLICATIONS

The present application is a Non-Provisional application that claims benefit of priority to U.S. Provisional Patent Application No. 61/801,189 entitled "Head to Media Proximity Detection" and filed on 15 Mar. 2013, which is specifically incorporated by reference herein for all that it discloses or teaches.

SUMMARY

In one implementation, a method and apparatus is provided for determining an active fly height setting for a transducer head from samples collected from a proximity sensor during less than a single revolution of a disc.

In another implementation, a method and system use adaptive discrete wavelet transform parameters generated from the collected samples to determine an active fly height setting for a transducer head.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

BRIEF DESCRIPTION OF THE DRAWINGS

A further understanding of the nature and advantages of the present technology may be realized by reference to the figures, which are described in the remaining portion of the specification.

DETAILED DESCRIPTION

Figure 1:
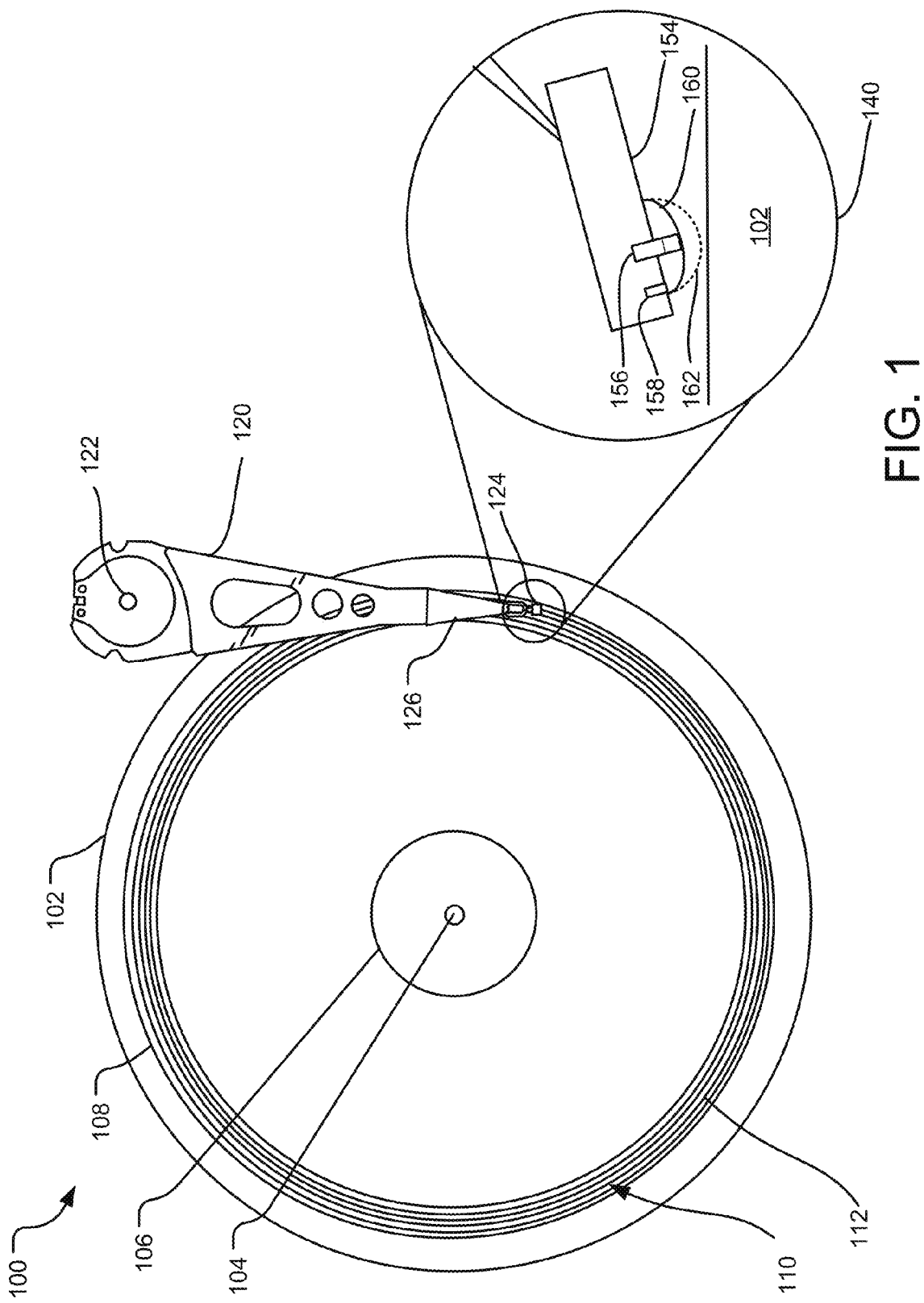
FIG. 1 illustrates an example disc drive system showing an adjustable close point, in one implementation.

Implementations of the present technology are disclosed herein in the context of a disc drive system. However, it should be understood that the technology is not limited to a disc drive system and could readily be applied to other data storage devices as well as to other tribological and technology systems. Disc drive systems use a transducer head including a write sensor, a read sensor, etc., that reads and writes data from storage media. Such a transducer head may be implemented on an actuator assembly that moves the transducer head in close proximity to the surface of the media. The distance between the transducer head and the surface of the storage media is referred to as the fly height or the flying height. If the fly height is too high, it results in poor quality of data reading and writing, on the other hand, if the fly height is too low, it results in the potential for the transducer head to bump into the storage media and get damaged. Therefore, the fly height of the transducer head is calibrated to determine the proper tradeoff between the signal quality and potential for physical damage to the transducer head. In one implementation of a disc drive, the fly height is actively controlled by a signal that changes the proximity of a close point of the transducer head to the media surface. For example, this control is to embed an electrical resistive heater in the transducer head that will cause a close point of the transducer head to protrude closer to the disk surface.

It can take many revolutions of a disc (e.g., 16-25 revolutions) in order to calibrate a disc drive system. This can cause damage to a transducer (e.g., a transducer head) and/or to the disc. Such damage can occur due to the transducer head and the disc coming into contact with one another during such a calibration. In certain implementations described herein, the amount of time that a transducer head and a disc are in contact with one another during calibration can be significantly reduced. Such an implementation can be accomplished by pushing a transducer head closer and closer to a disc and taking data samples from a proximity sensor.

One example of a proximity sensor is a device located next to the transducer head that will exhibit a change in resistance when it contacts a disc surface. The change in resistance can be caused by the increased temperature of proximity sensor as it rubs against the disc surface. Thus, the proximity sensor generates data samples that are based on the proximity of the sensor to the disc surface and the number of contacts between the proximity sensor and the disc head in the form of change in resistance, which can be measured in the form of current flowing through the proximity sensor, the voltage across the proximity sensor, or change in some other parameter of the proximity sensor. The data samples may be in form of analog signal representing such change in resistance, etc. In one implementation, such analog signals are converted to a large number of digital data values and sent to a processor, such as a processor used by the disc controller for further processing. For example, the processor may analyze patterns within the digital data samples, etc.

The processor may analyze patterns within the digital data samples. For example, the processor can use a mathematical processing technique referred to as adaptive discrete wavelet transforms (ADWT) to process the digital data samples provided by the proximity sensor to generate an ADWT parameter matrix. In one implementation, the processor uses the ADWT process to convert many thousands of digital data values provided by the proximity sensor to simply four parameter values (referred to as Param_1, Param_2, Param_3, and Param_4) for each position of the transducer head. A new set of the four parameters can be gathered for various positions of the transducer head, as the transducer head is pushed further and further toward the disc surface during a calibration routine.

During a calibration routine when the transducer head descends towards the disc surface, the four parameters exhibit a trend line. A contact between the transducer head and the recording medium of the disc is determined when one or more of the four parameters abruptly deviate from their respective trend lines. In one implementation, a contact between the transducer head and the recording medium of the disc is determined when all four parameters abruptly deviate from their respective trend lines. The transducer head can be pushed closer and closer to the recording medium during this process, for example, by a thermal expansion device such as a heater incorporated into the transducer head, where the heater can be controlled electrically, optically, etc. In one implementation, the thermal expansion device is incorporated inside the transducer head to expand a surface of the transducer head facing the media. Alternatively, the thermal expansion device may be incorporated in a transducer head assembly housing the transducer head. As the thermal expansion device is heated, it expands and pushes the transducer head closer and closer to the recording medium. Thus, one can change the position of the transducer head relative to the disc by controlling the thermal expansion device.

Once a contact is established between the transducer head and the disc, the setting of the thermal expansion device that caused the contact are stored in memory. This setting can be referred to as the close point setting because it is the setting that brought the transducer head into contact with the disc. Also, an active fly height setting (also referred to as the flying height setting) for the transducer head can be set by backing away the transducer head by a desired amount (e.g., 10 nanometers) from the surface of the disc so that the transducer head can fly above the disc during operation without causing contact.

In one implementation, a setting for the thermal expansion device is used to control the distance that the transducer head is backed away from the disc. For example, the energy applied to the thermal expansion device to increase its temperature is reduced to decrease the distance that the transducer head is backed away from the disc. Because the ADWT parameters allow a processor to readily perform this calibration routine, the calibration can be performed while gathering data during a very limited time period in which the transducer head and disc come into contact. Thus, the faster processing of ADWT parameters by the processor reduces the contact time between the transducer head and the disc surface. Such faster processing and the reduced contact time also allows for contact data to be collected within less than one revolution of the disc. Alternatively, expeditious gathering of large amounts of data samples for later processing and the use of adaptive discrete wavelet transforms (ADWT) to process the data samples results in substantial reduction in contact time between the transducer head and the disc surface.

FIG. 1 illustrates an implementation of an example of a disc drive 100 utilizing various methods and systems for determining active fly height as disclosed herein. It should be understood, however, that the described methods and systems may also be employed with other tribological systems and other types of storage media, including continuous magnetic media, bit-patterned media, etc.

The disc drive 100 includes a disc 102 that rotates about a spindle center or a disc axis of rotation 104 during operation. The disc 102 includes an inner diameter 106 and an outer diameter 108 between which are a number of concentric data tracks 110. Information may be written to and read from the disc 102 in different data tracks 110. A transducer head 124 is mounted on an actuator assembly 120 at an end distal to an actuator axis of rotation 122 and the transducer head 124 flies in close proximity above the surface of the disc 102 during disc operation. The actuator assembly 120 rotates during a seek operation about the actuator axis of rotation 122 positioned adjacent to the disc 102. The seek operation positions the transducer head 124 over a target data track of the data tracks 110.

The exploded view 140 illustrates the transducer head 124 (not to scale) as an enlarged head 154. In one implementation, the transducer head 154 progresses along a target data track as the disc 102 rotates in a substantially circular direction. The transducer head 154 includes a thermal expansion device 156 that can expand or contract based on energy provided to it in the form of electric current, optical energy, etc. In one implementation, the thermal expansion device 156 is positioned behind a write pole (not shown) of the transducer head 154. Alternatively, the thermal expansion device 156 may also be implemented at other locations in the transducer head 154.

The expansion of the thermal expansion device 156 moves a close point of a transducer head 154 from a position 160 (shown by solid line) to position 162 (shown by dashed line). Similarly, the contraction of the expansion device 156 moves the close point from the position 162 to the position 160. The transducer head 154 also includes a proximity sensor 158, such as a thermal-resistance temperature sensor, that allows for proximity readings to be indirectly obtained so that one can determine when the transducer head 154 contacts the surface of the disc 102. The proximity sensor 158 can determine a contact between the transducer head 154 and the recording medium, for example, by detecting a change in resistance caused by the contact with the recording medium. Alternatively, the contact can be detected based on change in the read signal of a read sensor (not shown) of the transducer head. Yet alternatively, change in the disc rotation speed, resulting from the contact, may be used to determine the contact.

In one implementation of a fly height calibration routine, the transducer head's close point can be driven towards the media surface until a gentle head-to-media contact is created. This can be done by using the thermal expansion device 156 to push the close point of the transducer head 154 closer to the media surface. Thus, the active fly height clearance of the transducer head 154 relative to the disc can be set by first establishing contact between the close point of the transducer head 154 and the disc surface and then by backing off the close point of the transducer head 154 from the contact point. The active fly height can be controlled by changing the amount of thermal expansion caused by the heater so that the close point of the transducer head is pushed out toward the recording medium or allowed to retract away from the recording medium. The adjustment of the active fly height can increase drive life and improve bit-error-rate performance.

The implementation disclosed above allows for a reduction in contact time between a head and a disk can be facilitated by the expeditious gathering of large amounts of data samples for later processing and the use of adaptive discrete wavelet transforms (ADWT) to process the data samples. Such implementation may be used to decrease the calibration time when a disc drive is initially manufactured and thereby increase the manufacturing output. In an alternative implementation, a self-adjusting contact detection may be used, which can perform fast on-demand type measurement when a disc drive is first manufactured as well as at later points in time when the disc drive is used in the field. In such implementation, the fly height settings are adjusted dynamically based on the on-demand contact detection measurements and such dynamic adjusting allows the disc drive to be re-calibrated after it is sold. For example, if the bit-error-rate performance of the drive degrades, the disc drive can be recalibrated in the field. This helps to improve the lifetime and/or the performance of the disc drive system.

In one implementation, an adaptive discrete wavelet transforms (ADWT) process may be used by a hard disc drive processor for head-disc proximity detection. The ADWT technique may be used with a variety of signal sources. For example, data samples from other sensors or available signals, such as head-signal amplitude modulation, head-signal harmonic ratios, and acoustical sensors can be used for head-disc proximity detection. For example, in a heat-assisted magnetic recording (HAMR) hard disc drive, a signal representing reflected laser power is used by the processor as an input signal for head-disc proximity detection.

One challenge in working with ADWT is the collection and processing of a significantly large amount of data-points (data samples) that are sampled, without adding extra hardware in the disc drive's controller ASIC. This challenge has been addressed in one implementation by utilizing a Synchronous Serial Interface (SSI) on a processor. An SSI interface operates at a very high data transmission rate. Therefore, a processor configured with an SSI interface is able to receive a stream of data samples output from a sampling process. The samples may be stored for later processing, e.g., on flash memory.

For example, a processor can sample analog data from a proximity sensor as a thermal expansion device causes a close point of a transducer head to move closer to a disc surface. These analog samples can be converted by a digitizer (e.g., an analog to digital converter (ADC)) and stored in memory. The data does not need to be processed (e.g., via ADWT calculations) while the samples are collected. Rather, the data may be stored to the memory on the drive and then processed at a later point in time. Such memory storing the data samples may be implemented on the disc drive, on a host device, or any other location that can be accessed by the processor for processing at a high data transfer rate. Such storing of data samples for later processing reduces the real-time demands on the processor during data collection so that the processor can merely obtain the samples.

Figure 2:
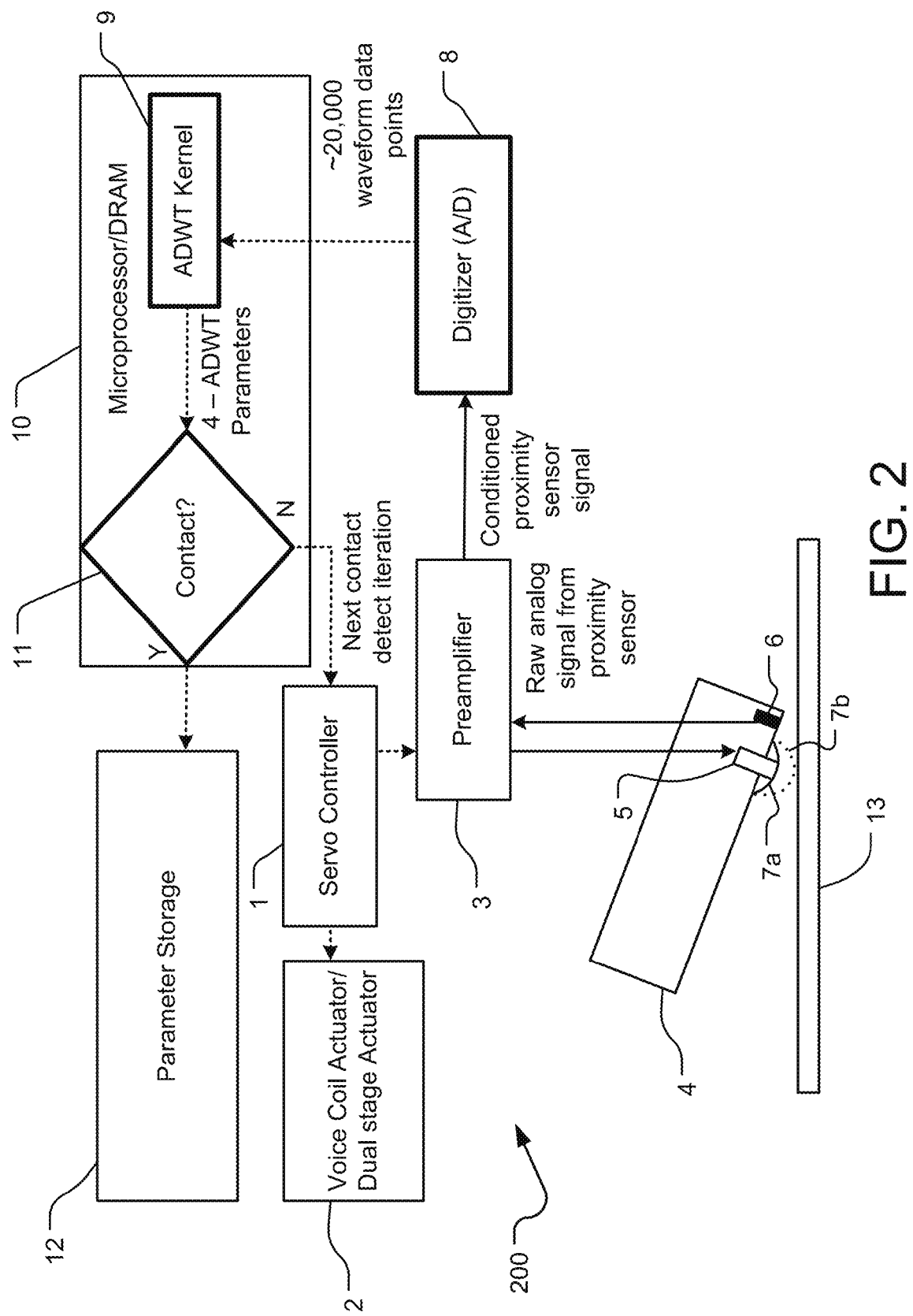
FIG. 2 illustrates a block diagram of a circuit for performing adaptive discrete wavelet transforms in one implementation.

Referring to FIG. 2, an example of a circuit in one implementation can be seen. A servo controller 1 is shown controlling a voice coil and dual stage actuator 2. A preamplifier 3 is used to convert servo controller commands into analog inputs/outputs for a transducer head 4. The transducer head 4 includes one or more thermal expansion devices 5 to move a close point of the transducer head 4 between positions 7a and 7b. The close point is the position on the transducer head 4 that makes contact with the disc 13 when a contact occurs.

Once a close point setting for the transducer head 4 is determined a desired active fly height setting can be selected. An active fly height setting can be selected, for example, by first causing a close point of the transducer head 4 to establish a contact with the recording medium and then backing off the close point of the transducer head 4 by a predetermined amount (e.g., by backing off of the close point position by ten (10) nanometers).

A proximity sensor 6 is shown in FIG. 2 as being integrated into the transducer head 4 and used to sense, for example, head to disc interface (HDI) modulation changes during the contact. The proximity sensor can be a resistive element that changes in resistance due to heat caused by contact of the proximity sensor with the disc. Alternatively, the proximity sensor 6 may detect the contact between the close point of the transducer head and the media surface using other methods, such as change in speed of the disc resulting from the contact, etc.

A digitizer 8 may be used to convert data from the proximity sensor and to output the data to an adaptive discrete wavelet transform (ADWT) module 9 in the processor 10. In one implementation the analog to digital converter is a Texas Instruments ADS7887. The processor 10 may include memory, such as DRAM. The ADWT module 9 may either immediately process the data it receives, such as the digitized waveform samples, or it may store the data in memory, such as DRAM memory for post-processing. Storing the data samples and then processing the data samples at a later point in time, the load on the processor 10 is reduced during the data collection phase.

In one implementation, the ADWT module 9 can process the data samples, such as the digitized waveform samples to generate four (4) ADWT parameters using an ADWT process. A decision block 11 determines whether the four (4) ADWT parameters indicate that contact can be declared. The use of ADWT process to convert the digitized waveform points into four ADWT parameters permits one to work with four parameters rather than thousands of coefficients. This simple four ADWT parameter representation of a large number of data samples is manageable and easy to implement in the processor 10 as the ADWT module 9 and contact decision block 11.

In one implementation, the following sequence of steps can be used with the circuit in FIG. 2 for contact detection. First, a servo controller 1 can issue a command to the thermal expansion device 5 via a preamplifier 3. The preamplifier 3 generates an appropriate amount of energy to be sent to the thermal expansion device 5. The thermal expansion device 5 pushes a close point 7 of the transducer head closer to the disc surface as shown by the protruded close point shape 7b. A proximity sensor 6 can be synchronized with the energy burst delivery to the thermal expansion device 5. The preamplifier 3 acquires the signals or the data samples generated by the proximity sensor 6 using an analog signal preconditioning circuit (not shown). In one implementation, the analog signal preconditioning circuit can amplify and band-limit the received signal by using a band-pass filter with its bandwidth tuned to capture head to disc-interface modulation.

A digitizer (analog-to-digital converter) 8 digitizes the conditioned analog signals from the proximity sensor 6. In one implementation, the digitizer 8 can sample the conditioned analog signal at a high sample rate, such as for example, at a sample rate of one million samples per second or faster. Sampling can begin at the same time as the thermal expansion device 5 is activated. The ADWT module 9 performs ADWT on the sample data points. This ADWT operation results in a matrix of four ADWT parameters. The matrix of parameters is sent to the decision block 11, which can apply programmed logic rules in order to classify the four ADWT parameter matrix as a contact event or as a no contact event.

If the decision block 11 determines a contact event, a corresponding thermal expansion energy setting is recorded and stored in a parameter storage 12, such as a memory. Alternatively, the thermal expansion energy setting that was used just prior to the thermal expansion energy setting that caused contact is stored in the memory. If no contact is detected, a new command is issued to the servo controller 1 to step up the thermal expansion energy. The entire process can be repeated iteratively to generate trend lines for the four parameters based on the iterative process.

Digitizer 8 can digitize an analog proximity probe signal at a sampling rate of greater than or equal to 1 million samples per second with at least eight bits resolution, for example. The digitizer's 8 capturing operation of a large number of data points can be synchronized with the operation of the thermal expansion device 5. In one implementation, the ADWT module 9 is a discrete wavelet transform (DWT) calculator enhanced by nonlinear functions and statistical framework and implemented by logic circuitry, such as a processor within a hard disc drive controller. An entire set of thousands of DWT coefficients representing head disc interface modulation can be expressed by four ADWT parameters.

The ADWT module 9 shown in FIG. 2 can be implemented in three stages. A first stage can perform an iterative DWT decomposition, where a signal is decomposed into sub-levels and expressed by DWT coefficients. A no redundant DWT representation of a monitored signal s(t) in time domain t can be expressed as follows:

$$s(t) = \sum_{k=-\infty}^{\infty} \sum_{l=m}^{M} d(k,l) 2^{-k/2} \psi(2^{-k} t - l) \quad (1)$$

where $\psi$ is a base function. Discretized dilation takes values of the form 2k, where k is an integer. At any dilation 2k, the translation parameter can take values of the form 2kl, where l is an integer. The actual values of the (k,l) are discrete wavelet W(a,b) coefficients:

$$W(a,b) = \Phi[s(t)], \Phi[s(t)] \in a = 2^k, b = 2^k l \quad (2)$$

This corresponds to sampling coordinates (a, b) on the so-called dyadic sampling grid, where consecutive values of discrete scales and corresponding sampling differs by a factor of two, thus enabling efficient implementation via computer code. The two-dimensional sequence d(k, l) is referred to as the discrete wavelet transform. Frequency and time can be assigned for the dilation and translation operations making this mathematical method of practical use. A compact Daubechies $4^{th}$ order DWT base function $\psi$ implementation via lifting scheme for the signal s can be expressed as follows:

$$\begin{cases} cA_1(n) = s(2n) + \sqrt{3}\, s(2n+1) \\ cD_1(n) = s(2n+1) - \frac{\sqrt{3}}{4} cA_1(n) - \frac{(\sqrt{3}-2)}{4} cA_1(n-1) \\ cA_2(n) = cA_1(n) - cD_1(n+1) \\ cA(n) = \frac{\sqrt{3}-1}{\sqrt{2}} cA_2(n) \\ cD(n) = \frac{\sqrt{3}+1}{\sqrt{2}} cD_1(n) \end{cases} \quad (3)$$

Here, n is a number of signal s data points. As it can be observed from Eq. 3, approximate or low pass cA coefficients are derived from even numbered signal s samples while cD detailed or high pass coefficients are obtained by sorting through odd samples.

The second stage of the ADWT module, sometimes referred to as "energy estimates", interacts with the first stage of the ADWT module where DWT coefficients at every sub-level are sorted by an entropy minimization process. The signal entropy E(s) at the selected composition level m can be calculated as follows:

$$\text{Min}\{E(s) = \Sigma_m s_m^2 \log(s_m^2)\} \quad (4)$$

Near-zero entropy ADWT levels are excluded from further calculations. Stage three of the ADWT module can be referred to as "waveform evaluation parameters," where distribution of the DWT coefficients are expressed in the entropy form and represented via integrative and differential parameters. Applying the DWT orthonormality property to its entropy measure provides the following expression:

$$E(s^2) \Rightarrow \sum_m \{E(cA_m^2) + E(cD_m^2)\} \quad (5)$$

Thus, integrative and differential parameters of the DWT coefficient entropy functions can be expressed as:

$$\text{Param\_1} = \Sigma_m E(cA_m^2) \quad (6)$$

$$\text{Param\_2} = \Sigma_m E(cD_m^2) \quad (7)$$

$$\text{Param\_3} = \text{Range}\{E(cA^2)\} \quad (8)$$

$$\text{Param\_4} = \text{Range}\{E(cD^2)\} \quad (9)$$

Here, Param_1 and Param_3 are sums of the entropy's of squared approximate and detailed DWT coefficients. Param_2 and Param_4 are ranges of the entropies of squared approximate and detailed DWT coefficients. As can be seen, this compact representation of a waveform by four ADWT parameters (Eqs. 6-9) contains HDI modulation dynamics and can be used to declare head-media contact.

One method of determining when head-media contact occurs is by tracking the progression of the four ADWT parameters determined for each successive thermal expansion energy value used. When the amplitude of each of the four parameters suddenly exceeds a respective baseline trend for each respective ADWT parameter, that is an indication of a contact occurring between a close point of the transducer head and the disc surface. For example, when four ADWT values are determined for a thermal expansion device energy, a contact detection is indicated by: (1) the Param_1 value exceeding the baseline trend of previously determined Param_1 values; (2) the Param_2 value exceeding the baseline trend of previously determined Param_2 values; (3) the Param_3 value exceeding the baseline trend for previously determined Param_3 values; and (4) the Param_4 value exceeding the baseline trend for previously determined Param_4 values. Alternatively, such contact detection may be indicated by less than all four parameters suddenly exceeding a respective baseline trend for each respective ADWT parameter. Upon detection of contact occurring between the close point of the transducer head and the disc, the thermal expansion energy setting that caused contact to occur between the close point of the transducer head and the disk can be stored in a parameter block 12. Alternatively, the thermal expansion energy setting that was used immediately prior to contact being detected is stored in memory.

ADWT techniques can be advantageous in comparison to Fast Fourier Transform (FFT) techniques. This is due to ADWT's flexible sampling windows and low signal-to-noise ratio processing capabilities. Being able to respond to low signal-to-noise ratio signals can be valuable for heat assisted magnetic recording technology.

Figure 3:
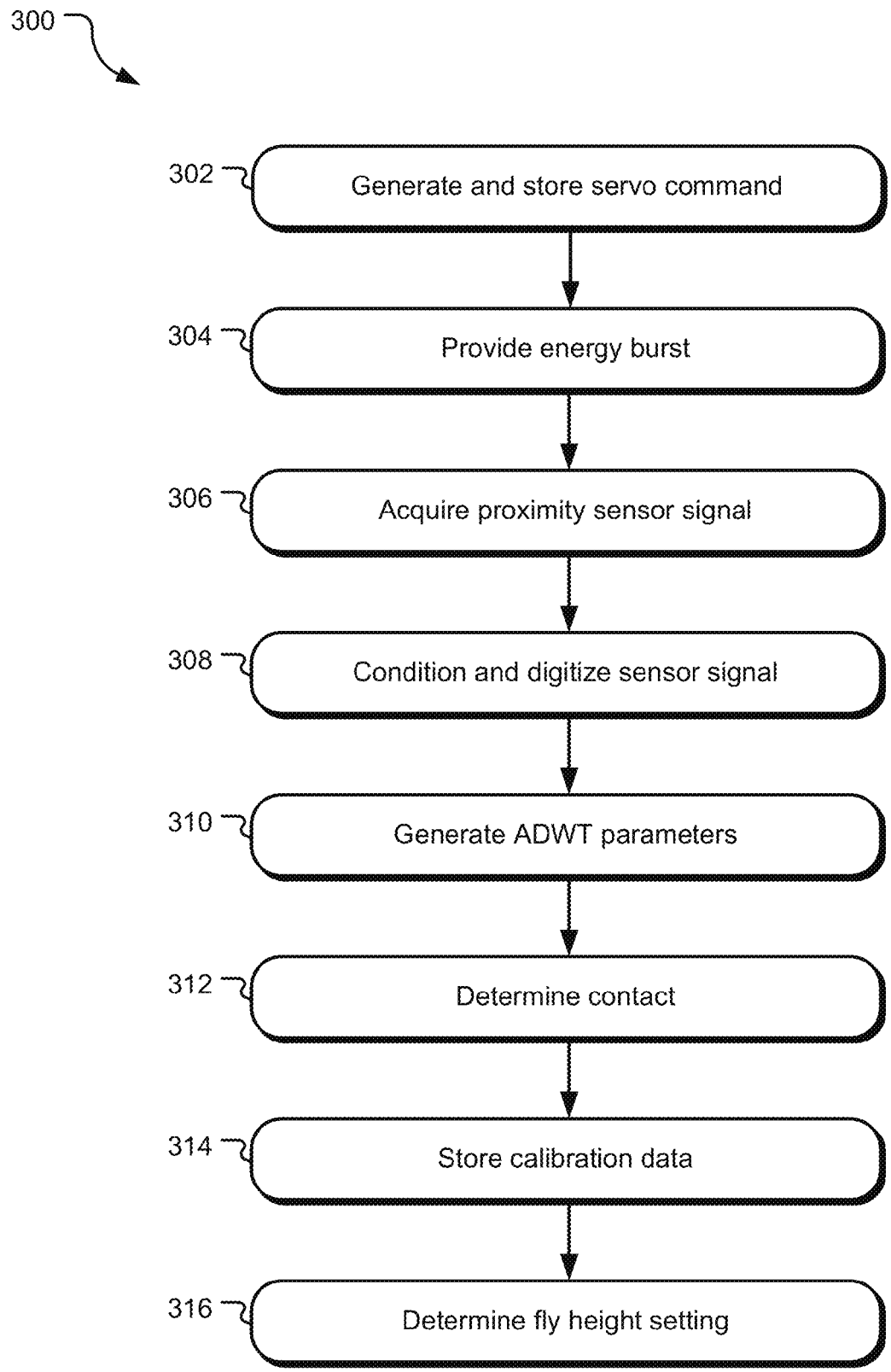
FIG. 3 illustrates a flowchart demonstrating a method of determining an active fly height setting, in one implementation.

FIG. 3 illustrates a flowchart 300 for a method of determining an active fly height setting. A servo controller operation 302 generates a command for a thermal expansion device. The command is stored in a memory together with the time stamp when the command is issued, Subsequently, an operation 304 generates an energy burst using a preamplifier and provides the energy burst to the thermal expansion device. Depending on the structure of the thermal expansion device, the energy burst may be in the form of an electrical signal energy burst, an optical energy signal, etc. The energy burst causes the thermal expansion device to move a close point of the transducer head closer to the disc surface.

An operation 306 acquires proximity sensor signals from a proximity sensor configured on the transducer head. In one implementation, the proximity sensor signal may be an analog signal in the form of a change or resistance signal. Alternatively, the proximity sensor signal may be a signal representing a change of speed for the disc, etc. The proximity sensor signal may be communicated to a conditioning circuit and the time stamp of when the proximity sensor signal was collected may be stored in memory. The proximity sensor signal is conditioned and digitized by an operation 308. For example, an ADC module may sample the analog form of the proximity sensor signal at a very high rate to generate digitized form of the proximity sensor signal.

An operation 310 uses the digitized form of the proximity sensor signal to generate ADWT parameter matrix. In one implementation, the ADWT parameter matrix may include four ADWT parameters, namely Param_1, Param_2, Param_3, and Param_4, in accordance with the equations 6-9 disclosed herein. The ADWT parameters are stored in a memory. An operation 312 analyzes the ADWT parameters to determine if a contact has occurred between a close point of the transducer head and the disc surface. In one implementation, such contact is determined if all four parameter exceed their respective baseline trends. Thus, the analyzing operation 312 may generate the trend lines in real time and compare the current values of the ADWT parameters with the trend lines. In an alternative operation, less than all four ADWT parameters are used to determine contact.

A storing operation stores the trend line data and the contact detection data together with the time when the contact is detected. Such data may be stored together with the data representing when the energy bursts are provided to the thermal expansion device, when the proximity sensor data is collected, etc. One or more of such stored data is used by an operation 316 to determine fly height setting for the disc drive. In one implementation, the operation 316 determines an active fly height setting for a transducer head using data samples collected during less than a single revolution of a disc. The four ADWT parameters allow interpretation of data to be performed such that sufficient samples can be gathered during less than one revolution of the disc. This is relevant in that other methodologies may require as many as 16-25 revolutions to calibrate a hard disc drive.

Figure 4A:
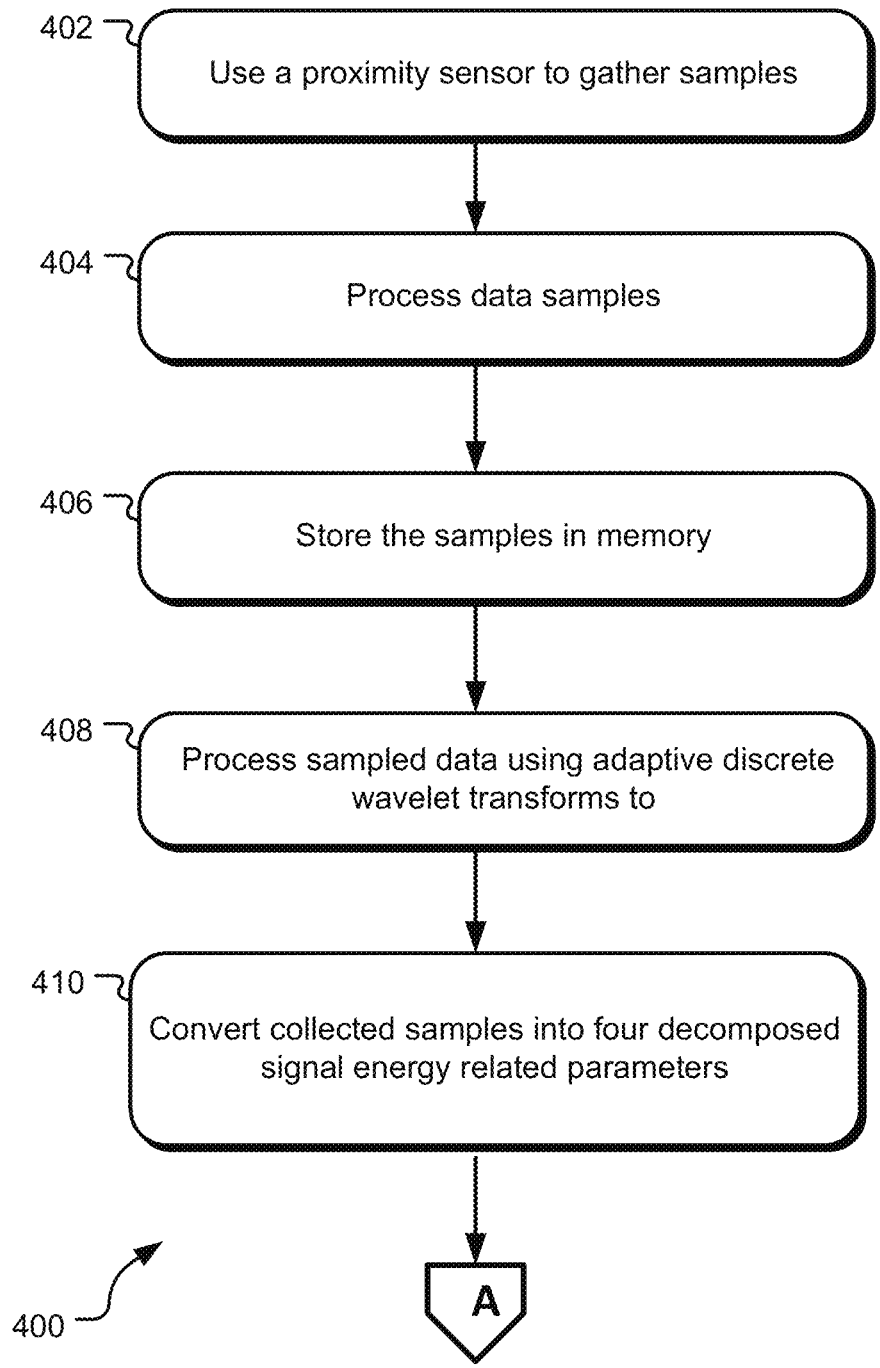
FIGS. 4A and 4B illustrate another flowchart demonstrating a method of determining an active fly height setting in another implementation.
Figure 4B:
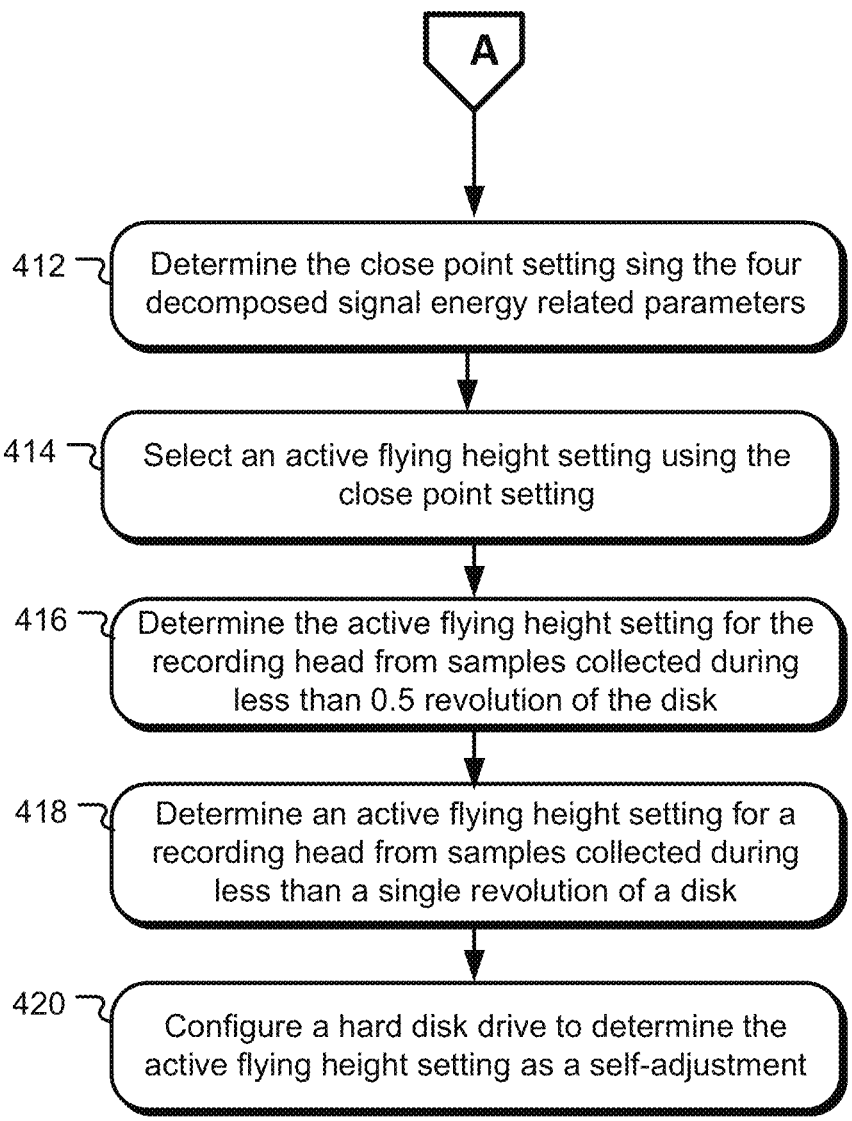

Referring now to FIGS. 4A and 4B, a flowchart 400 can be seen. Flowchart 400 illustrates a detailed example for determining an active fly height setting for a device, such as a hard disc drive. In operation block 402 a proximity sensor is used to gather data samples. Such data samples may be in the form of analog signals representing the proximity of a close point of a transducer head with respect to a disc surface. At block 404 the proximity sensor data samples are processed using a conditioning circuit and an ADC circuit. For example, the data samples can be sampled at a rate of greater than or equal to one million samples per second to generate digitized data samples. In operation block 406, the data samples are stored in memory. A memory device such as a DRAM can be used to receive data for storage at a high input rate. In block 408, an adaptive discrete wavelet transform process may be used to evaluate sampled data. Block 410 shows that at least one adaptive discrete wavelet transform can be used to convert collected samples into four decomposed signal energy related parameters In block 412 of FIG. 4B, the four decomposed signal energy related parameters may be used to determine a close point setting. With the close point setting determined, block 414 shows that an active fly height setting can be determined. For example, the close point of the transducer head (sometimes referred to as a transducer head) can be brought into contact with the disc to establish the close point setting; and, then the close point of the transducer head can be retracted away from the disc by a predetermined amount. In blocks 416 and 418, the active fly height setting for the transducer head can be determined from samples collected without during smaller durations for expansion of the thermal expansion device. For example the determination can be made from data collected with the expansion device active for less than one full revolution of the disc. As another example, the determination can be made from data collected with the expansion device active for less than one half a revolution of the disc.

While the processes described herein can be particularly useful to calibrate a newly manufactured hard disc drive, for example, the processes may also be used once a device has been in service for some time. Thus, the process may be used so as to recalibrate a hard disc drive that has fallen out of calibration, for example. Operation block 420 of FIG. 4 shows that a hard disc drive can be configured to determine an active fly height setting as a self-adjustment. Alternatively, one might recalibrate a device for the close point setting. In one or more implementations, the process may also be used for spinstand testing of a disc drive.

Based on the collected data, the energy level provided to the thermal expansion device that corresponds to a contact between the close point of the transducer head and the media surface can be recorded in parameter storage. Similarly, the energy level provided to the thermal expansion device that establishes the active fly height for the transducer head can also be stored in the memory.

Figure 5:
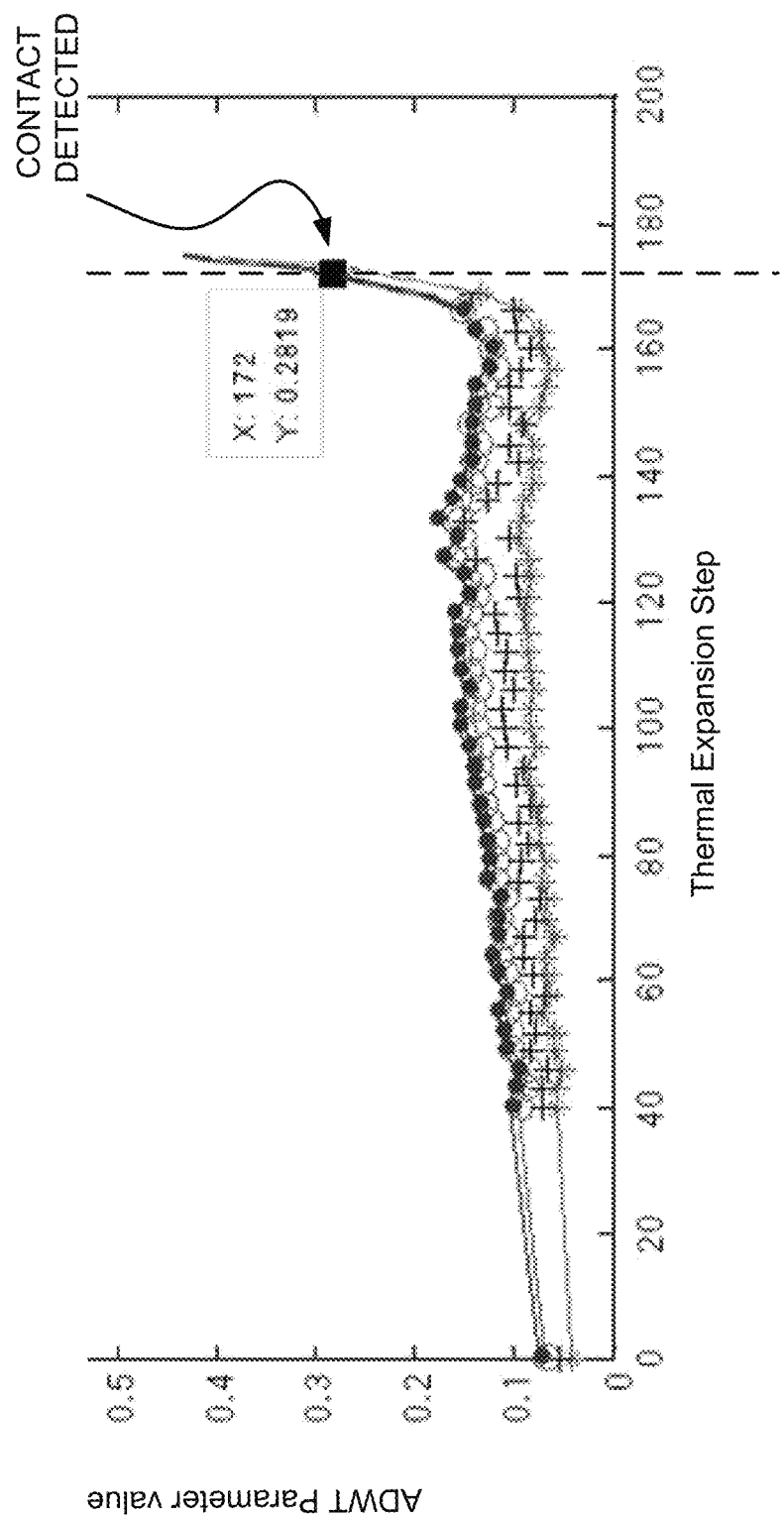
FIG. 5 illustrates an example of determining head to media contact using the ADWT parameters in another implementation.

FIG. 5 illustrates an example of determining head to media contact using the ADWT parameters in another implementation. Specifically, the Y-axis denotes the values of the four ADWT parameters and the x-axis denotes the steps for the thermal expansion device. The data used in FIG. 5 is gathered by moving a transducer head closer and closer to a disc and determining for each position the four ADWT parameters associated with that position. The four ADWT parameters are generated as described above from a sensor value such as a proximity sensor. The graph data establishes four trend lines that abruptly turn upwards. The position indicated as X=172 and Y=0.2819 corresponds to where all four parameters (Param_1, Param_2, Param_3, and Param_4) substantially exceed their respective baseline trends. Thus, FIG. 5 illustrates that in this example contact between the transducer head and the disc occurred at thermal expansion step position 172 for the thermal expansion device that moves the close point of the transducer head closer to the disc. Moreover, that point of contact is considered the close point setting. A processor can perform the calculation of a deviation from a trend line quite readily. Therefore, the processor may be programmed to identify when the four ADWT parameters suddenly exceed their trend lines.

Figure 6:
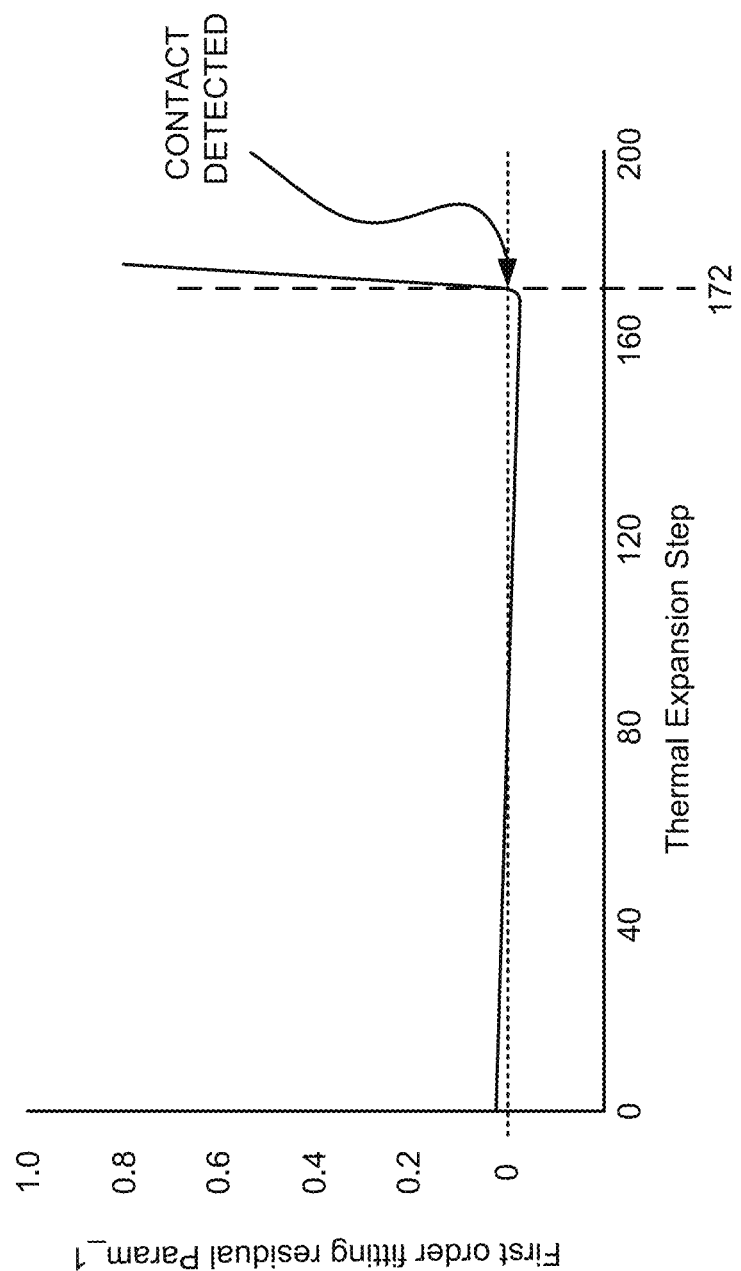
FIG. 6 illustrates an alternative example of determining head to media contact using the ADWT parameters in another implementation.

FIG. 6 illustrates an alternative example of determining head to media contact using the ADWT parameters in another implementation. Specifically, FIG. 6 illustrates a first order fitting residual of parameter Param_1. The first order fitting residuals are calculated as the difference between the normalized real-time value of ADWT Param_1 and the first order fitting value of the ADWT Param_1. According to the graph of FIG. 5 when the fitting residuals change sign and significantly increase in amplitude, a contact is declared between a close point of the transducer head and the disc surface.

It is noted that many of the structures, materials, and acts recited herein can be recited as means for performing a function or step for performing a function. Therefore, it should be understood that such language is entitled to cover all such structures, materials, or acts disclosed within this specification and their equivalents, including any matter incorporated by reference.

The apparatuses and methods of implementations described herein will be understood from this specification. While the above description is a complete description of specific implementations, the above description should not be taken as limiting the scope of the patent as defined by the claims.

What is claimed is:

1. A method comprising:
determining, from four decomposed parameters, an active fly height setting for a transducer head from samples collected from a proximity sensor during less than a single revolution of a disc using adaptive discrete wavelet transforms ADWT to generate the four decomposed parameters from collected samples.

2. The method of claim 1 further comprising:
imparting a stimulus to change proximity of a close point of the transducer head from a disc surface; and
collecting the samples from the proximity sensor.

3. The method of claim 2 wherein imparting the stimulus further comprises imparting thermal energy to a thermal expansion device configured to change proximity of a close point of the transducer head from a disc surface.

4. The method of claim 2 wherein imparting the stimulus further comprises imparting the stimulus for less than substantially half revolution of the disc.

5. The method of claim 1 wherein using the adaptive discrete wavelet transforms (ADWT) comprises using at least one adaptive discrete wavelet transform to convert collected samples into four decomposed signal energy related parameters.

6. The method of claim 5 further comprising using the four decomposed signal energy related parameters to determine the active fly height setting.

7. The method of claim 1 further comprising determining a close point setting for the transducer head, wherein the close point setting is the setting of an expansion device of the transducer head that causes a close point of the transducer head to contact the disc surface.

8. The method of claim 1 wherein the determining the active fly height setting comprises using a processor to determine the active fly height setting from collected samples stored in a memory.

9. The method of claim 1 further comprising configuring a hard disc drive to determine the active fly height setting as a self-adjustment.

10. The method of claim 1, wherein determining an active fly height setting for a transducer head further comprising determining an active fly height setting for a transducer head during less than a single revolution of a disc.

11. An apparatus comprising:
a transducer head having a proximity sensor;
a disc;
a processor configured to determine an active fly height setting for the transducer head using an adaptive discrete wavelet transforms (ADWT) process from samples collected from the proximity sensor during less than a single revolution of the disc.

12. The apparatus of claim 11 further comprising:
a digitizer configured to digitize the samples collected from a proximity sensor; and
a memory configured to store the digitized samples.

13. The apparatus of claim 11 further comprising a thermal expansion device configured to bring a close point of the transducer head into close proximity with the disc.

14. The apparatus of claim 11 wherein the processor is further configured to convert at least one coefficient generated by the adaptive discrete wavelet transforms into four decomposed signal energy related parameters.

15. The apparatus of claim 14 wherein the processor is further configured to determine the active fly height setting based on change in the values of at least one of the four decomposed signal energy related parameters.

16. The apparatus of claim 14 wherein the processor is further configured to determine the active fly height setting based on change in the first order fitting residuals of at least one of the four decomposed signal energy related parameters.

17. The apparatus of claim 11 wherein the processor is configured to determine the active fly height setting for the transducer head from samples collected during less than half a revolution of the disc.

18. An apparatus comprising:
a disc;
a transducer head;
a thermal expansion device disposed proximate the transducer head;
a proximity sensor configured to output analog data signals;
a digitizer configured to convert the analog data signals from the proximity sensor to digital data;
a memory configured to receive the digital data from the digitizer;
an adaptive discrete wavelet transforms module configured to generate four decomposed signal energy related parameters from the digital data; and
a processor configured to determine an active fly height setting for the transducer head using at least one of the four decomposed signal energy related parameters.

* * * * *